UNITED STATES PATENT OFFICE.

MIDDLETON CRAWFORD, OF COLORADO SPRINGS, COLORADO, ASSIGNOR OF THREE-FOURTHS TO THOMAS C. PARRISH AND DUNCAN CHISHOLM, OF SAME PLACE, AND JAMES POURTALES, OF SILESIA, GERMANY.

PROCESS OF EXTRACTING PRECIOUS METALS FROM THEIR ORES.

SPECIFICATION forming part of Letters Patent No. 543,674, dated July 30, 1895.

Original application filed October 29, 1894, Serial No. 527,341. Divided and this application filed December 8, 1894. Serial No. 531,206. (No specimens.)

*To all whom it may concern:*

Be it known that I, MIDDLETON CRAWFORD, a subject of the Queen of Great Britain, (but having declared my intention of becoming a citizen of the United States,) residing at Colorado Springs, in the State of Colorado, have invented certain new and useful Improvements in the Process of Extracting Precious Metals from Their Ores, (Case C,) whereof the following is a specification.

My invention relates to certain improvements in the extraction and recovery of precious metals from their ores by means of the solvent action upon said metals of the salts of cyanogen, commonly known as the "cyanide" process.

Generally speaking, the cyanide process consists, first, in lixiviating the pulverized ores with a solution of cyanide of potassium or other similar salt, the result being the formation from a portion of the gold or other precious metal of a soluble aurocyanide of potassium or other corresponding salt, which is taken up in the solution, and, second, in separating the precious metals from this solution, either by electrolysis or by passing the solution over zinc plates or shavings, whereby the precious metals are precipitated, or by other appropriate means. This process has heretofore usually been applied to what are termed "tailings"—that is, gangue which has already been treated by an amalgamating process—the amalgamating process, as is well known, being very efficient for the removal of the larger particles of gold, but always failing, more or less, to remove the microscopic or float gold, or the gold contained in concentrates, which latter forms are particularly amenable to the cyanide process.

My present invention relates particularly to the first step of the cyanide process—viz., the preparation of the cyanide solution itself—and is intended to expedite the process and so enhance its efficiency as to permit it to be employed with commercial success for direct treatment of the crushed ore.

The chief difficulty hitherto incurred in the cyanide process has resulted from the great length of time necessary to fully dissolve the precious metal in the cyanide solution, requiring, as ordinarily practiced, many days, or even weeks.

It has been recognized hitherto that the solution of gold—for instance, in cyanide of potassium—and the consequent formation of an aurocyanide require the presence of oxygen, the formula by which this reaction takes place being expressed as follows:

$$4Au - 8KCy - 2O = 4KAuCy_2 - 2K_2O,$$

and methods have been experimented with in order to supply the extra molecule of oxygen required. In two applications filed by me relating to this general subject—viz., Serial Nos. 527,341 and 527,342, filed under date of October 29th, 1894, of the former of which this application is a division—I have set forth processes whereby this result may be obtained, and so far as I am aware prior to this group of processes invented by me no practical results have been obtained in the direction indicated.

The difficulties heretofore experienced were twofold: First, the excess of oxygen attempted to be supplied has been found to be in such unstable combination with the solution as to be lost before it can be made practically available for taking up any very substantial amount of gold, thus rendering it impossible to use the solution for anything like a continuous process, and, second, the substances which have been added to the cyanide solution for the purpose of thus imparting to it an excess of oxygen have been accompanied by greater or less quantities either on the one hand of acid or on the other hand of alkali, both of which are highly detrimental to, if they do not substantially prevent, the proper carrying out of the process. Either an acid or alkaline excess in the solution tends to oxidize any base metals which may be present in the ore, so that the cyanide attacks them in preference to the gold, and, furthermore, any excess of acid has a tendency to effect direct decomposition of the cyanide, throwing off hydrocyanic acid.

I have found that the necessary molecule of oxygen can be afforded in a practically permanent condition and unattended by any of the disadvantages referred to by mixing with the cyanide solution a percentage of cyanate of the corresponding salt. The most direct method of obtaining this result is to add the cyanate, as such, to the cyanide solution; but, obviously, any chemical or electrical or other process which is capable of converting a portion of the cyanide into cyanate without incidentally developing deleterious substances or otherwise impairing the efficiency of the remaining cyanide would accomplish this result.

To practically carry out my process in the preferred manner, I proceed as follows: I take an ordinary cyanide solution, cyanide of potassium being the usual and most convenient salt for the purpose, the strength of this solution being that ordinarily employed in the well-known cyanide processes. I add thereto and thoroughly combine therewith cyanate of potash or other base, preferably, of course, the same as is present in the cyanide. Ordinary cyanide of potassium usually contains a percentage of cyanate, varying considerably in amount. This percentage, however, is not sufficient to accelerate to any appreciable extent the lixiviating process. It is desirable, in order to obtain good results, that the total amount of cyanate in the solution should be not less than twenty-five per cent. of the amount of cyanide in said solution. In many cases the best results are obtained when the percentage of cyanate to cyanide is from fifty to one hundred. Any increase, however, above this latter point is objectionable, and retards rather than accelerates the process.

It is of course important that the cyanate which is employed for the process should be free from deleterious substances, such as would be capable of producing the injurious effects above noted as incident to the formerly-suggested processes.

With the solution prepared as above stated, the powdered ore containing the precious metal is lixiviated and, if necessary, agitated.

Although under ordinary circumstances, and in accordance with methods heretofore commercially employed, the agitation of pulverized ore with a cyanide solution requires to be carried on for many days, or even weeks, before the dissolution of the precious metal is complete, I find that by the combination of a cyanate with the cyanide solution I am able to so facilitate the lixiviating process that it practically occupies only about an hour.

When the lixiviating process has proceeded for the requisite length of time, the gangue and also the solution are withdrawn from the lixiviating-vessel, and if the ore which is being treated has contained comparatively coarse particles of the metal, of such character as to be incapable of complete solution by a cyanide process under any circumstances within a reasonable time, the gangue with its accompanying solution is subjected to an amalgamating process, whereby this coarse gold may be reclaimed. If amalgamation in the presence of an electric current is employed a certain portion of the dissolved metal is also obtained from the solution by precipitation. The solution itself is then treated electrolytically until the dissolved gold is separated therefrom, whereupon the residue of the cyanide solution may be re-utilized, since the percentage of cyanate will be found to still persist in and to be capable of again performing its function in connection with the cyanide.

I believe that the reaction characteristic of this process may be described as follows: The oxygen, whose presence is required for the proper attack by the cyanide upon the metal, is found in the cyanate, this salt existing as such at the outset of the process in conjoint solution with the cyanide. When, however, the gold has been taken up and the aurocyanide of potassium formed, the oxygen remains present in combination with the potassium in the form of caustic potash. After the electrolytic action has taken place and the gold is separated, the oxygen resumes its initial combination—viz., in the cyanate of potash now redeveloped. This alternation of form explains the continuity of my process and the stability of the solution which I employ.

The advantages of this process are obvious. The comparatively short time required for the lixiviating process enables ore to be rapidly run through, and the quantity of ore which may be treated by a given amount of cyanide is very greatly increased. This renders it practicable to apply the cyanide process, not merely to tailings, but to the crushed ore direct from the mine, and by combining it with an amalgamating process in the order I have described—that is to say, passing the gangue over the mercury subsequent to the lixiviating process—I find that the process may be made practically continuous, with the result of extracting a larger proportion of precious metal from the ore than has hitherto been possible, even by the use of two separate processes.

Having thus described my invention, I claim—

1. The improved process of extracting precious metals from their ores, which consists in adding to a solution of ordinary commercial cyanide a cyanate of the corresponding salt until the total cyanate is not less than twenty-five per cent. of the amount of cyanide in said solution; lixiviating the ore therewith and extracting the dissolved precious metals from said solution, substantially as described.

2. The improved process of extracting precious metals from their ores, which consists in preparing a solution of ordinary commercial cyanide; converting a portion of such cyanide into cyanate until the total amount of cyanate present is not substantially less than twenty-five per cent. of the total remaining cyanide, such conversion being unaccompanied by the addition of any substantial acid or alkaline excess; lixiviating the ore with said solution and extracting the dissolved precious metals therefrom, substantially as described.

3. The improved process of extracting precious metals from their ores, which consists in forming a solution of a cyanide and a cyanate of the corresponding base, the total amount of cyanate being not less than twenty-five per cent. of the total amount of cyanide present; lixiviating the ore therewith and extracting the dissolved precious metals from said solution, substantially as described.

MIDDLETON CRAWFORD.

Witnesses:
S. C. MILLS,
W. E. POULTON.